United States Patent
Snodgrass et al.

(10) Patent No.: US 10,820,160 B1
(45) Date of Patent: Oct. 27, 2020

(54) HF POSITIONING VIA SMOOTHING OF IONOSPHERIC UNDULATIONS

(71) Applicant: Rockwell Collins, Inc., Cedar Rapids, IA (US)

(72) Inventors: Timothy E. Snodgrass, Palo, IA (US); John V. Thommana, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 16/752,215

(22) Filed: Jan. 24, 2020

(51) Int. Cl.
| | |
|---|---|
| *H04W 4/029* | (2018.01) |
| *H04W 4/024* | (2018.01) |
| *G01S 5/02* | (2010.01) |
| *G01S 5/10* | (2006.01) |

(52) U.S. Cl.
CPC .......... *H04W 4/029* (2018.02); *G01S 5/021* (2013.01); *G01S 5/0221* (2013.01); *G01S 5/0236* (2013.01); *G01S 5/0257* (2013.01); *G01S 5/10* (2013.01); *H04W 4/024* (2018.02)

(58) Field of Classification Search
CPC ..... H04W 4/029; H04W 4/024; G01S 5/0221; G01S 5/10; G01S 5/0236; G01S 5/021; G01S 5/0257
See application file for complete search history.

(56) References Cited

U.S. PATENT DOCUMENTS

| | | | |
|---|---|---|---|
| 3,573,819 A | 4/1971 | Richardson et al. | |
| 4,455,556 A | 6/1984 | Koshio et al. | |
| 4,760,587 A | 7/1988 | Ehlinger et al. | |
| 5,160,932 A | 11/1992 | Bull | |
| 5,510,797 A * | 4/1996 | Abraham | G01S 19/14 342/352 |
| 6,259,894 B1 * | 7/2001 | Tekinay | G01S 3/46 375/343 |
| 9,766,322 B2 * | 9/2017 | Taylor, Jr. | G01S 5/10 |
| 10,148,345 B2 | 12/2018 | Robey | |
| 2007/0276598 A1 * | 11/2007 | Tillotson | G01W 1/10 342/357.52 |
| 2010/0103902 A1 * | 4/2010 | Kim | H04L 5/0048 370/330 |
| 2010/0225541 A1 * | 9/2010 | Hertzog | G01S 5/0221 342/387 |
| 2016/0291124 A1 * | 10/2016 | Bauer | G01S 5/0252 |
| 2019/0361111 A1 * | 11/2019 | Sadiq | H04B 7/0695 |
| 2020/0112498 A1 * | 4/2020 | Manolakos | G01S 5/0236 |

FOREIGN PATENT DOCUMENTS

EP 3349032 A1 7/2018

* cited by examiner

*Primary Examiner* — Julio R Perez
(74) *Attorney, Agent, or Firm* — Suiter Swantz pc llo

(57) ABSTRACT

A system and method for HF positioning characterizes the undulations of the ionosphere in real-time to determine the refraction altitude of a specific HF frequency at a specific time of day at a specific position. The system accounts for the seasonal (summer, winter) and daily (daylight, night, grey-line transition) variations of the ionosphere determining a highly accurate timing error relative to a timing reference. The system employs a novel approach that is capable of passively and accurately determining a position anywhere in the world without use of a GNSS signal receiving known-time transmissions of narrow band HF timing signals refracted via ionospheric skywave.

15 Claims, 13 Drawing Sheets

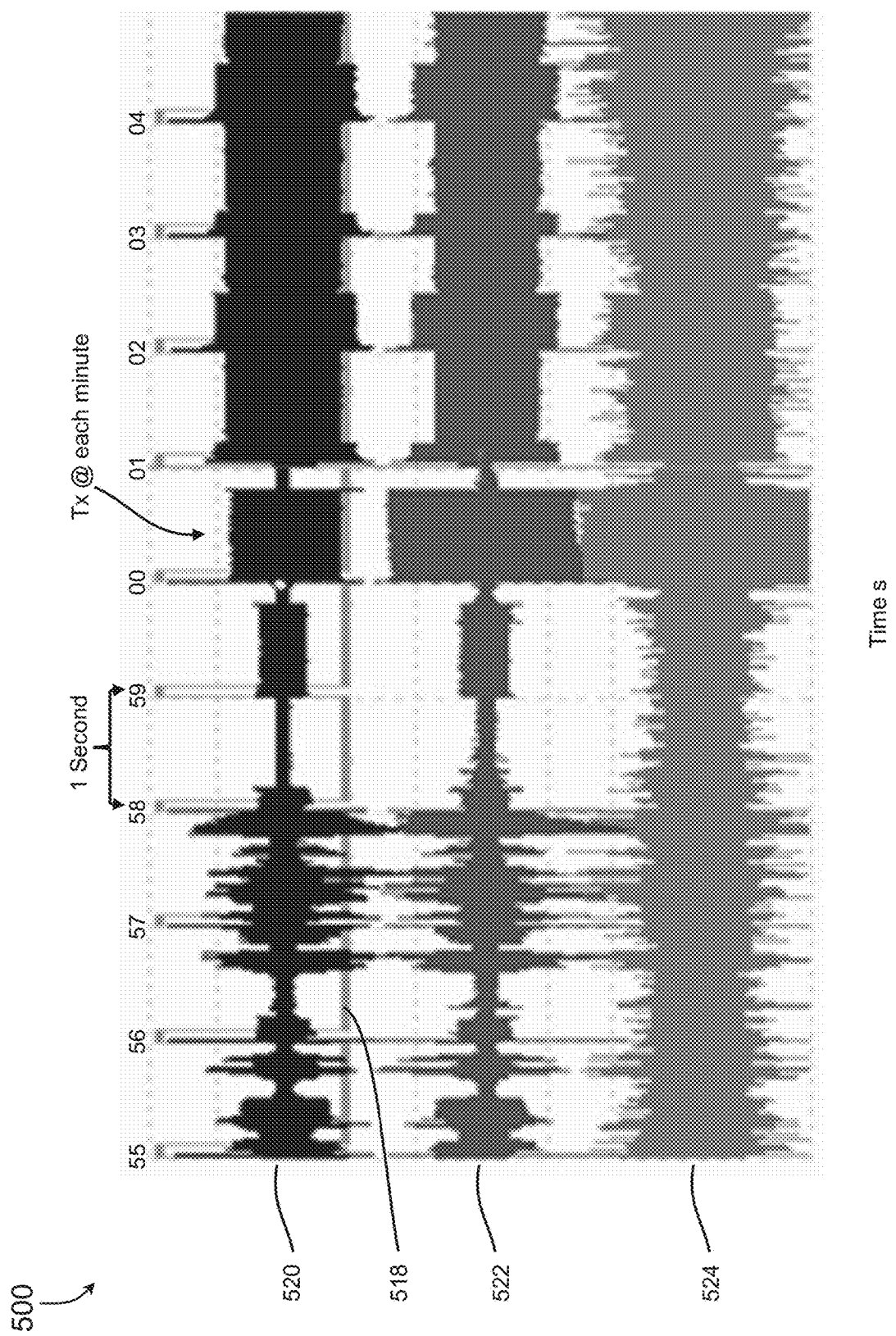

HF POSITIONING VIA SMOOTHING OF IONOSPHERIC UNDULATIONS

BACKGROUND

Obtaining accurate positioning information using a Global Navigation Satellite System (GNSS) may present a challenge during periods when GNSS signals may be jammed or unreliable. During Anti-Access Area Denial (A2AD) conditions GNSS positioning and therefore navigation, is not available. When operating over largely featureless terrain such as the world's oceans and certain deserts, other methods of deriving precise navigational position updates such as Terrain contour matching (TERCOM) and Digital Scene Matching Area Correlation (DSMAC) are also unavailable.

Other than a star tracker, there is no current method to provide a positioning aid other than eLoran, which does not cover all parts of the world. Traditional amplitude directional analysis and phase relationship techniques (Loran, Omega) may require re-construction of expensive and outdated transmission stations. Further, to include worldwide coverage, eLoran upgraded systems may also require new construction of Low Frequency 100 kHz stations for transmission of surface following signals.

As most of the historical transmission stations have been dismantled, some commercial and military positioning applications may be heavily reliant upon GNSS signals for accurate positioning solutions as well as other uses. A2AD leading to inertial navigation systems (INS) drifts of up to 1 NM per hour may cause undue harm and prevent certain operations.

HF positioning has traditionally been inaccurate due in part to the range of the available HF signals and the path the HF signals may follow as refracted from the random fluctuating level of the ionosphere. Limited to a single frequency or a single date, ionospheric variations cause unreliable signal reception.

Therefore, a need remains for a system and related method which may overcome these limitations and provide a novel solution to accurate and passive HF positioning.

SUMMARY

In one aspect, embodiments of the inventive concepts disclosed herein are directed to a system for passive high frequency (HF) positioning. The system may comprise a multi-channel HF receiver configured for passively receiving a plurality of HF timing signals on a plurality of HF frequencies and an analog to digital converter operatively coupled with the multi-channel HF receiver. An inertial navigation system (INS) may be configured to determine 1) a general position of a platform and 2) a timing reference while a controller may be operatively coupled with each of the analog to digital converter and the INS.

A tangible, non-transitory memory may be configured to communicate with the controller, the tangible, non-transitory memory including a table of ionospheric altitudes at a specific time, a specific date, and a specific position, a dataset of earth geometric constants, and a table of transmission source data representing a plurality of transmission sources, the tangible, non-transitory memory having instructions stored therein that, in response to execution by the controller, cause the controller to carry out the steps of the system for passive HF positioning.

In function, the system for passive HF positioning may, while in a known position, receive the known position of the platform from an onboard positioning source and receive an HF timing signal of the plurality of HF timing signals. The system may determine a transmission source identification (ID) associated with a transmission source of the received HF timing signal and recall a transmission source position from the memory based on the transmission source ID. The system may determine a measured time of arrival (TOA) of the HF timing signal and compare the measured TOA of the HF timing signal to the timing reference to determine a propagation time.

The system may also determine a refraction path of the HF timing signal based on the propagation time and determine a midpoint ionospheric altitude at a midpoint between the known position and the transmission source position based on the refraction path and the transmission source position. Once the system determines the midpoint ionospheric altitude, the system may update the table of ionospheric altitudes within the memory based on the determined midpoint ionospheric altitude.

The system may further, while in an unknown position, receive the plurality of HF timing signals on the plurality of HF frequencies and isolate two or more HF timing signals of the received plurality of HF timing signals. The system may determine a transmission source ID of each of the isolated HF timing signals via a passive analysis of the isolated HF timing signals and recall the transmission source position of the isolated HF timing signals from the memory based on the transmission source ID.

The system may also designate two or more HF timing signals of the isolated HF timing signals to use to determine a positioning solution, the designation based on 1) the general position of the platform, 2) a local date at the general position of the platform, 3) a local time at the general position of the platform, and 4) a frequency of the plurality of received HF timing signals and determine a midpoint between the transmission source position and the general position of the platform for each of the designated HF timing signals.

In addition, the system may recall a midpoint ionospheric altitude at the midpoint of each of the designated HF timing signals from the updated table of ionospheric altitudes and determine the measured TOA of each of the designated HF timing signals. The system may compare the measured TOA with the timing reference to determine the propagation time and determine a refraction path of each of the designated HF timing signals based on the propagation time and the midpoint ionospheric altitude.

For positioning, the system may determine a surface range between the platform and each transmission source of the designated HF timing signals based on the refraction path and the midpoint ionospheric altitude and determine a passive HF positioning solution of the platform based on 1) the general position of the platform and 2) the surface range between the platform and each transmission source of the designated HF timing signals.

A further embodiment of the inventive concepts disclosed herein may include a method for passive HF positioning. The method may comprise, while in a known position, receiving the known position of a platform from an onboard positioning source and receiving an HF timing signal of a plurality of HF timing signals.

The method may include determining a transmission source identification (ID) of the received HF timing signal and recalling a transmission source position from an onboard memory based on the transmission source ID. The method may further include determining a measured TOA of the HF timing signal and comparing the measured TOA of the HF timing signal to an onboard timing reference to determine a propagation time.

The method may further include determining a refraction path of the HF timing signal based on the propagation time, the known position, and the transmission source position and determining a midpoint ionospheric altitude at a midpoint between the known position and the transmission source position based on the known position, the refraction path and the transmission source position. The method may include updating the table of ionospheric altitudes within the onboard memory based on the determined midpoint ionospheric altitude;

The method may include, while in an unknown position, receiving a plurality of HF timing signals on a plurality of HF frequencies and isolating two or more HF timing signal of the received plurality of HF timing signals. Then method may further include determining the transmission source identification (ID) of the received HF timing signal and recalling the transmission source position from the onboard memory based on the transmission source ID.

The method may also include designating two or more HF timing signals of the isolated HF timing signals to use to determine a positioning solution, the designating based on 1) a general position of the platform, 2) a local date at the general position of the platform, 3) a local time at the general position of the platform, and 4) a frequency of of the isolated HF timing signals and determining a measured TOA of each of the designated HF timing signals.

Further, the method may include determining a midpoint between the transmission source position and the general position of the platform for each of the designated HF timing signals and recalling a midpoint ionospheric altitude at the midpoint of each of the designated HF timing signals from the updated table of ionospheric altitudes. The method may also include comparing the measured TOA with the onboard timing reference to determine a propagation time for each of the designated HF timing signals and determining a refraction path of each of the designated HF timing signals based on the propagation time and the midpoint ionospheric altitude.

To determine the passive HF positioning solution, the method may include determining a surface range between the platform and each transmission source of the designated HF timing signals based on the refraction path and the midpoint ionospheric altitude and determining a passive HF positioning solution of the platform based on 1) the general position of the platform and 2) the surface range between the platform and each transmission source of the designated HF timing signals.

It is to be understood that both the foregoing general description and the following detailed description are exemplary and explanatory only and are not necessarily restrictive of the inventive concepts as claimed. The accompanying drawings, which are incorporated in and constitute a part of the specification, illustrate embodiments of the inventive concepts and together with the general description, serve to explain the principles of the inventive concepts disclosed herein.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings in which

FIGS. 5A-5C are diagrams of an exemplary reception plot at the platform in accordance with one embodiment of the inventive concepts disclosed herein;

DETAILED DESCRIPTION OF EXEMPLARY EMBODIMENTS

Figure 1:
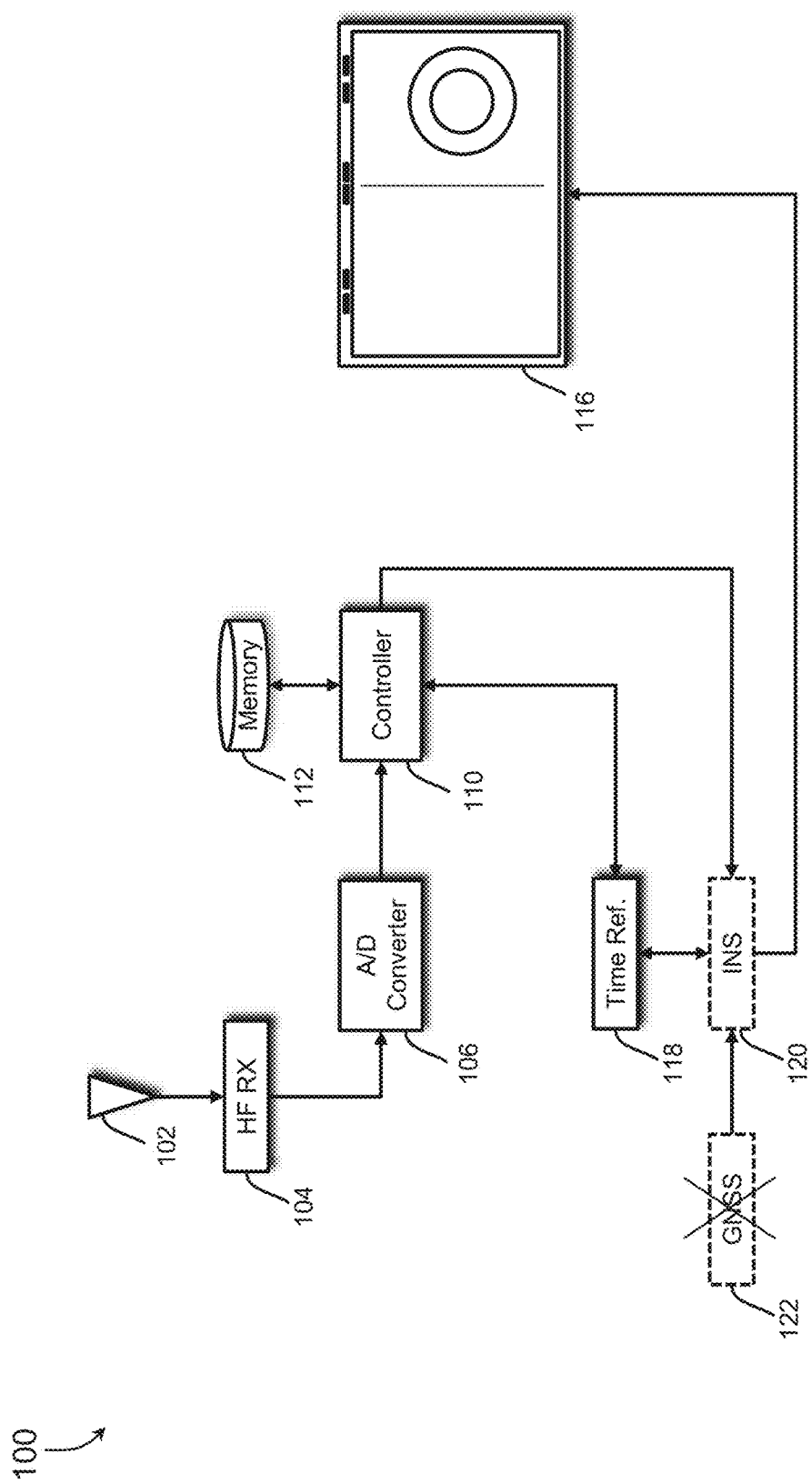
FIG. 1 is a diagram of a system for passive high frequency (HF) positioning in accordance with an embodiment of the inventive concepts disclosed herein.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, thus "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Overview

Broadly, embodiments of the inventive concepts disclosed herein are directed to a system and method for HF positioning. The system and method may characterize the undulations of the ionosphere in real-time to determine the refraction altitude of a specific HF frequency at a specific time of day at a specific position. The system accounts for the seasonal (summer, winter) and daily (daylight, night, greyline transition) variations of the ionosphere determining a highly accurate timing error relative to a timing reference. The system employs a novel approach that is capable of passively and accurately determining a position anywhere in the world without use of a GNSS signal receiving knowntime transmissions of narrow band HF timing signals refracted via ionospheric skywave.

REFERENCE CHART

100 System for passive high frequency (HF) positioning
102 HF Antenna
104 Multi-channel HF Receiver
106 A/D Converter
110 Controller
112 Memory
116 Flight Display
118 Timing Reference
120 Inertial Navigation System (INS)
122 GNSS
200 Pacific View
202 Platform
210 HF Positioning Solution
230 WWV Transmission Arc
240 BPM Transmission Arc
300 Midwest View
320 Surface Range
330 Transmission Source
332 Platform
400 Side View
410 Ionosphere
412 Midpoint
420 Refraction Path
422 Ionospheric Altitude
424 Depth at Midpoint
432 Midpoint Range
500 Reception plots at the platform
502 Time Zero
504 TOA at Platform
506 HF timing signal Initial burst
508 Propagation Time
510 Data describing the initial burst
518 Plot of Timing Reference
520 Plot of 15 MHz reception
522 Plot of 10 MHz reception
524 Plot of 5 MHz reception
600 Raw TOA Measurements
700 Expanded Raw TOA Measurements
800 Running Average Error
900 Four Day Plot
1000 Sorted Data
1100 Method Flow

FIG. 1 System

Referring to FIG. 1, a diagram of a system for passive high frequency (HF) positioning in accordance with an embodiment of the inventive concepts disclosed herein is shown. Generally, the system for passive high frequency (HF) positioning 100 may include a multi-channel HF receiver 104 sited on a platform 202 (FIG. 2) configured for passively receiving a plurality of HF timing signals on a plurality of HF frequencies. The Multi-channel HF receiver 104 may be coupled with an HF antenna 102 for reception of an entirety of the HF band of HF signals. In embodiments, the multi-channel HF receiver 104 may be configured to receive HF timing signals on frequencies within an approximate range of 2 MHz to 30 MHz. The multi-channel HF receiver 104 may be coupled with an analog to digital (A/D) converter 106 to digitize, once the HF timing signals are received, the entirety of the HF band of HF timing signals.

For example, a WWV HF transmitter near Ft. Collins, Colo. may radiate at a power of 10 kW at 2.5 MHz, 5 MHz, 10 MHz, 15 MHz; 20 MHz, and 25 MHz. Conversely, a CHU transmitter near Ottawa, ON may operate at 3 kW (3.33, 14.67 MHz), and at 10 kW (7.85 MHz). The system for passive HF positioning 100 may function to receive the entirety of the HF spectrum (e.g., approximately 2 MHz to 30 MHz. Each transmission source may transmit a binary-coded decimal (BCD) time code on a 100 Hz sub-carrier of the established frequency.

In one embodiment of the inventive concepts disclosed herein, the receiver 104 may be able to receive the entirety of the HF band. However, useful frequencies within the HF band may be a lesser group. Depending on a solar cycle, some frequencies may be unusable at a specific time today while in the year 2030, those frequencies may be particularly useful to the system for passive HF positioning 100.

In one embodiment of the inventive concepts disclosed herein, the platform may include a surface vehicle, a mobile device, a surface of subsurface vessel, an aerial vehicle, a handheld device, and an unmanned aircraft system (UAS). Generally, any platform 202 operating in a space void of GNSS signals may benefit of the embodiments disclosed herein.

The system for passive HF positioning 100 may include an inertial navigation system (INS) 120 configured to determine 1) a general position of a platform 202 and 2) a timing reference 118. Under some conditions, a Global Navigation Satellite System (GNSS) 122 may couple with the INS 120 and function to update the INS 120 with GNSS positioning data. However, should GNSS signals be unavailable, the system for passive HF positioning 100 may function to determine an accurate HF positioning solution for the platform 202.

In embodiments, the controller 110 may receive the timing reference from a plurality of additional sources. One timing reference may be relative to a coordinated universal time (UTC) e.g., every minute. In addition, the timing reference may be broadcast within a network shared between the transmission source 330 and the platform 202. Here, once each receives the timing reference, the controller 110 may accurately measure each HF timing signal for precise TOA. Further, the timing reference may be broadcast within the HF timing signal allowing the controller 110 to synchronize with the HF timing signal and measure each TOA based on the synched clock.

A controller 110 may operatively couple with each of the A/D converter 106 and the INS 120, the controller 110 configured for carrying out each function of the system for passive HF positioning 100. For interaction with a crew of the platform, a flight display 116 may offer a human machine interface for exemplary touch screen or cursor-controlled interaction with the system for passive HF positioning 100. In embodiments, the controller 110 may be implemented as an FPGA as well as a processor or both.

A tangible, non-transitory memory 112 may be configured to communicate with the controller 110, the tangible, non-transitory memory 112 may include, inter alia, a table of ionospheric altitudes at a specific time, a specific date, and a specific position and a dataset of earth geometric constants. The memory 112 may also include a table of transmission source data representing a plurality of transmission sources including frequencies transmitted, position, power output, signal details, etc. The tangible, non-transitory memory 112 may also have instructions stored therein that, in response to execution by the controller 110, may cause the controller to carry out each function of the system for passive HF positioning 100.

In one embodiment of the inventive concepts disclosed herein, the table of ionospheric altitudes may include a plurality of tables which may detail and characterize a plurality of properties of the ionosphere at each specific position around the earth. For example, the tables of ionospheric altitudes may include a worldwide grid of ionospheric altitudes at an exemplary five-minute interval for each day of the year. The grid spacing and timing interval may be as detailed as an exemplary every mile at five-minute intervals or to save memory space, an exemplary every 30-60 miles at 30-minute intervals may be desirable. The table detail (and therefore memory 112 used) may be individually determined by a user based on the desired accuracy of the HF positioning solution.

In one embodiment of the inventive concepts disclosed herein, the tangible, non-transitory memory 112 may include an earth geometric dataset, a solar dataset, a frequency propagation per time of day dataset, and a geomagnetic dataset.

In one embodiment of the inventive concepts disclosed herein, the controller 110 may function to characterize the refraction altitude of the ionosphere as a function of time of day, date, and frequency from known locations that are transmitting a modulation burst on precise UTC second intervals. (e.g.: WWV (Ft. Collins, Colo.), WWVH (Kekaha, Hi.), CHU, (Barrhaven, Ontario) as well as COTHEN, HFGCS and ARINC sites). The digitizing receiver 104 may capture the TOA of the one-second bursts on a multiplicity of frequencies from a multiplicity of transmitter locations. By using an INS and gathering running samples of hundreds of TOA measurements from each transmitter, the receiver's position can be determined with the use of a Kalman filter and an INS.

Table Data

In one embodiment of the inventive concepts disclosed herein, the tables of ionospheric altitudes within the memory 112 may include a plurality of information characterizing the properties of the ionosphere around the earth. After careful study, ionospheric undulations may occur, yet may occur at a predictable rate per location, time of day, and date. For example, one table may include: a time of day, a frequency propagation at time of day, a frequency signal to noise per time of day, a solar data, a geomagnetic data, and an ionospheric altitude at date local time.

Contemplated herein, the ionospheric altitude at a specific local date and time may vary little during a short duration if interest to the system for passive HF positioning 100. For example, at noon local time at a specific position, the ionospheric altitude may vary little between a first hour and a second hour. Embodiments herein may leverage this relative stability of the ionospheric altitude to employ the system for passive HF positioning 100 to determine the accurate HF positioning solution with a desired accuracy.

System Function

In one embodiment of the inventive concepts disclosed herein, the system for passive HF positioning 100 may function generally to provide the table of ionospheric altitudes to the controller 110 and then update the table based on actual received signals while the platform receiver in a known position. Then, when the platform 202 may be in an unknown position without GNSS signals or accurate INS data available, the system for passive HF positioning 100 may function to rely on the updated table data to accurately determine the HF positioning solution within the desired accuracy.

In one embodiment of the inventive concepts disclosed herein, the controller 110 may employ a Kalman filter to filter the plurality of received HF timing signals and determined positioning solutions and determine a centroid of the positioning solutions to determine the most accurate positioning solution.

FIG. 2 Pacific

Figure 2:
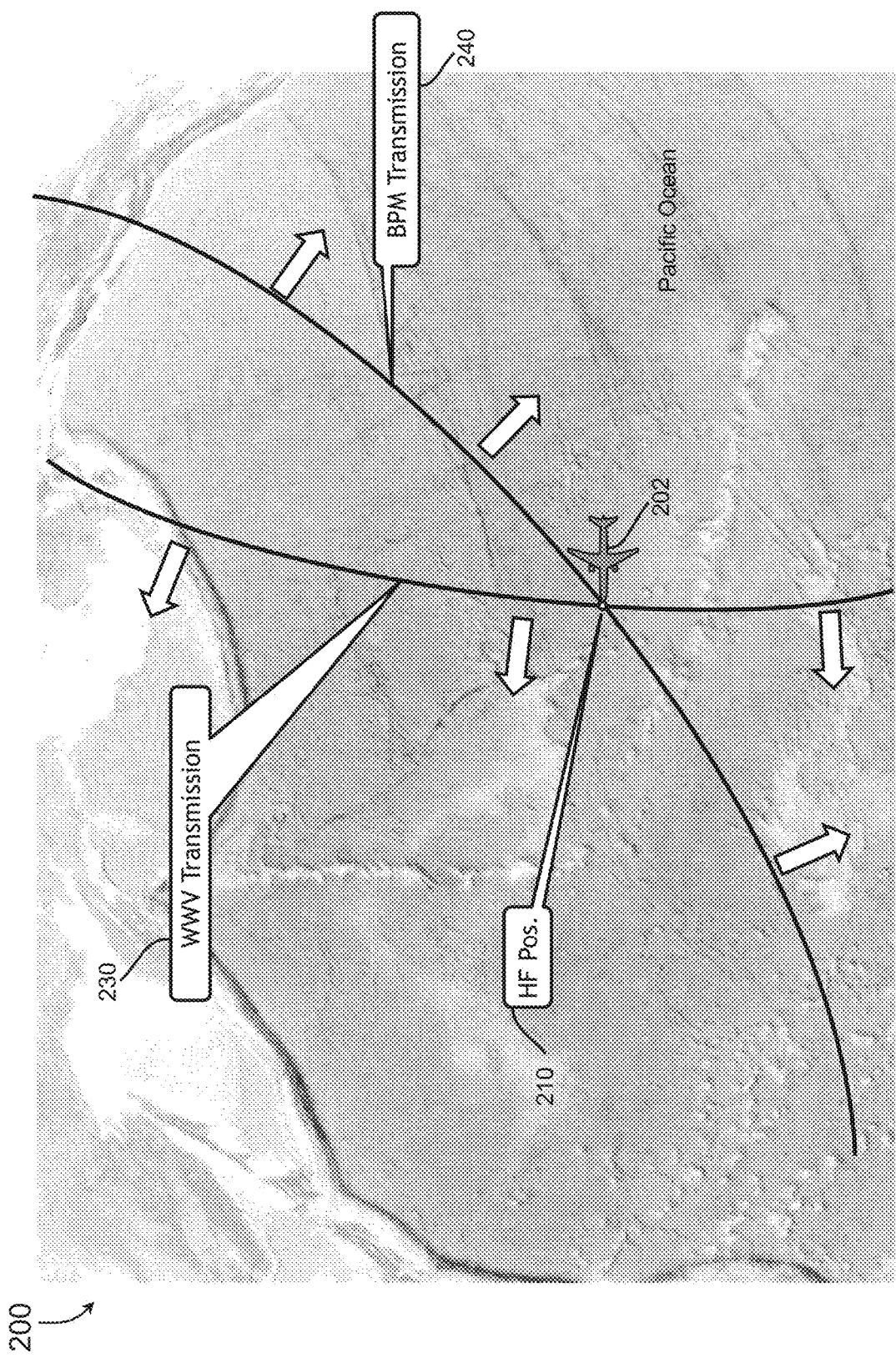
FIG. 2 is an overhead diagram of HF timing signals in the Pacific in accordance with an embodiment of the inventive concepts disclosed herein.

Referring now to FIG. 2, an overhead diagram of HF timing signals in the Pacific in accordance with an embodiment of the inventive concepts disclosed herein is shown. A pacific view 200 may detail one exemplary situation where the system for passive HF positioning 100 may be of value in determining an HF positioning solution 210.

The system for passive HF positioning 100 may employ two or more of the transmission sources to achieve the HF positioning solution 210 of desired accuracy. Each transmission from the transmission stations may produce an arc of expanding size representing the HF transmission from the station. As the intersection of the arcs from each of the transmission stations may be found in two locations over the earth, the controller 110 may employ a last known position from one or more sources to determine a general position of the platform 202. Here, the controller 110 may use a previous INS fix to determine the system for passive HF positioning 100 is in the Pacific (at the Pacific intersection of the arcs) and not the North Atlantic (at the other intersection of the arcs).

In one embodiment of the inventive concepts disclosed herein, the more available independent HF timing signals received and usable by the controller 110, the greater the accuracy of the HF positioning solution 210. For example, an HF timing signal from a transmission source in Australia may be of value to the system for passive HF positioning 100 while operating in the Pacific.

Here, the controller 110 may receive each of the indicated signals, one from WWV near Ft. Collins, Colo. in the US transmitting on 20 MHz indicated by a WWV transmission arc 230 and another from BPM near Pucheng, China transmitting on 15 MHz represented by a BPM transmission arc 240. Each transmission source transmitting a binary-coded decimal (BCD) time code on a 100 Hz sub-carrier of the established frequency.

In one embodiment of the inventive concepts disclosed herein, the controller 110 may function to verify a transmission source 330 position during periods when the platform 202 is within known locations. As some operations may require a zero-trust networking (e.g., an assumption of compromised signals and transmission of false information), the controller 110 may verify the received position of each transmission source 330 matches that position within the memory or within the received verified position. For example, during periods while the platform 202 may be within GPS coverage or during periods of verified known locations, the controller 110 may validate the stored location of each transmission source 330 with the measured values to enable an identification of invalid or misleading HF positioning signal and discount those signals from the eventual HF positioning solution.

In one embodiment of the inventive concepts disclosed herein, the controller 110 may not be limited to processing HF timing signals received from known, fixed locations transmitting the UTC-based HF timing signal. One embodiment, may enable the controller 110 to process HF timing signals from temporary transmission sources 330 (not necessarily similar to that used by WWV or at those frequencies) in a plurality of locations. For example, a ship at anchor or underway in a specific direction in a specific location as well as a broadcasting while loitering UAS etc. Some arbitrarily placed HF timing signal transmission sources may periodically broadcast and advertise their location, heading and speed over tactical networks such as a Mobile User Objective System (MUOS), UHF SATCOM, Link-16 and the like.

As the controller 110 may receive and process HF timing signals from these temporary transmission sources 330, the architecture may add a layer of trust to the HF positioning solution and limit the ability of a potential adversary to spoof the signals. It may also provide the operator with credible timing sources that aid the triangulation geometry in a specific theatre or region.

One advantage of the controller 110 use of the temporary transmission source 330 may include these signals may be of much lower power limiting a coverage region thereby making it more difficult for the potential adversary to detect and deny because the frequencies, time bursts may not be necessarily aligned to minute marker (e.g., UTC) but to an exemplary 34-second marker or a transmission security (TRANSEC) covered timing interval (or random but known), etc. may be used to secure the signal.

In one embodiment of the inventive concepts disclosed herein, the system for passive HF positioning 100 may also be configured to receive HF timing signals from a plurality of transmission sources not currently transmitting an HF timing signal but contracted to do so. For example, one operator may desire a plurality of HF timing signals transmitted in a general position such as a high commercial air traffic area of the North Atlantic. The operator may contract with multiple HF transmission sources across the Atlantic using the precise HF timing signals transmitted by these contracted sources at a designated UTC based time and received by the system for passive HF positioning 100 to accurately position each aircraft in the North Atlantic.

FIG. 3 Top View

Figure 3:
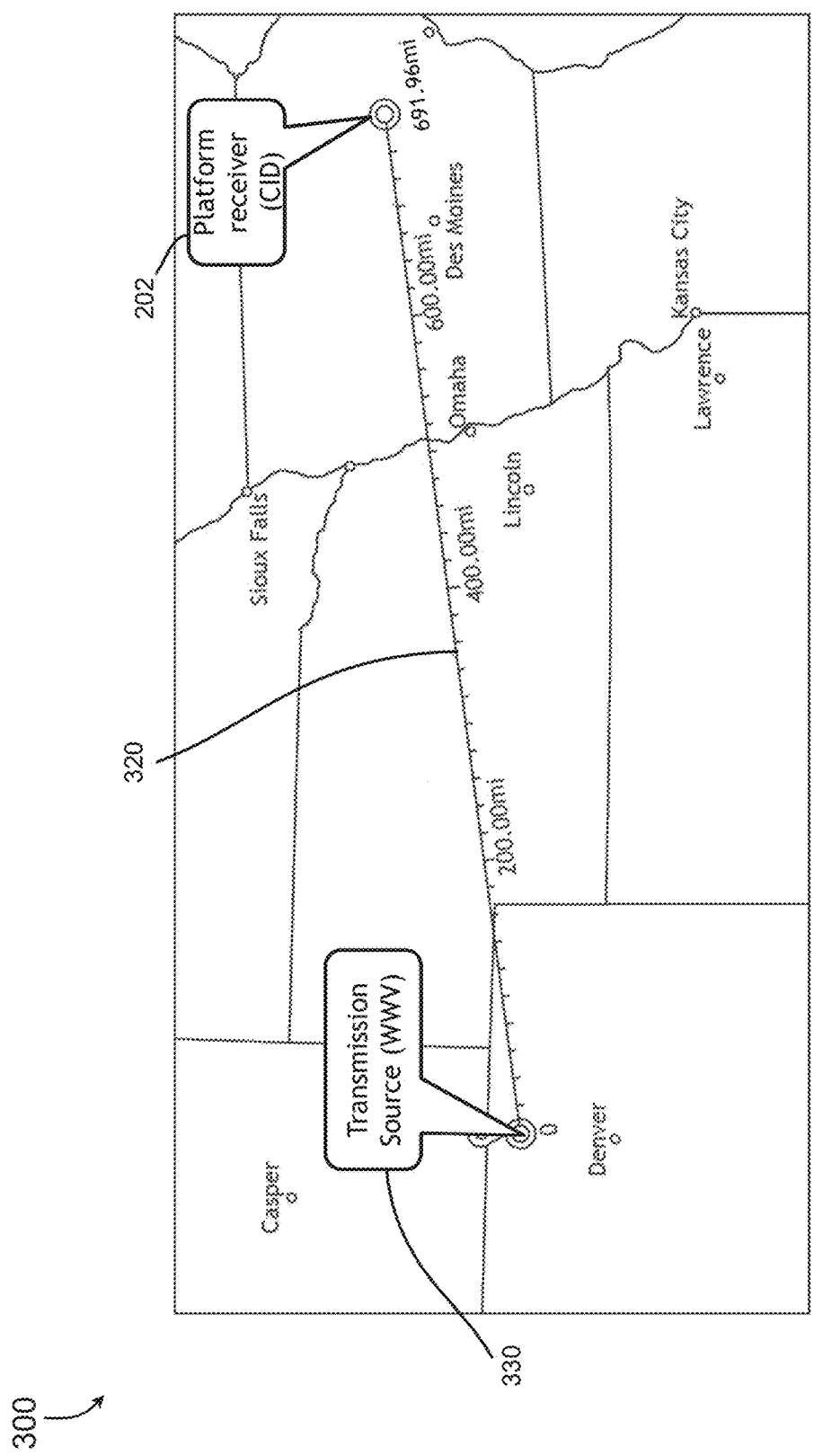
FIG. 3 is an overhead diagram of HF timing signals in the Midwest exemplary of an embodiment of the inventive concepts disclosed herein.

Referring now to FIG. 3, an overhead diagram of HF timing signals in the Midwest exemplary of an embodiment of the inventive concepts disclosed herein is shown. A Midwest view 300 may indicate a transmission source 330 (WWV) transmitting HF timing signals received by the receiver 104 aboard the platform 202 (here, at CID) at a surface range 320 of 691.96 miles. In embodiments, the surface range 320 may be a great circle range from point to point on the surface of the earth. Additional information of the exemplary HF timing signal transmission and more importantly, reception is detailed below.

FIG. 4 Geometry

Figure 4:
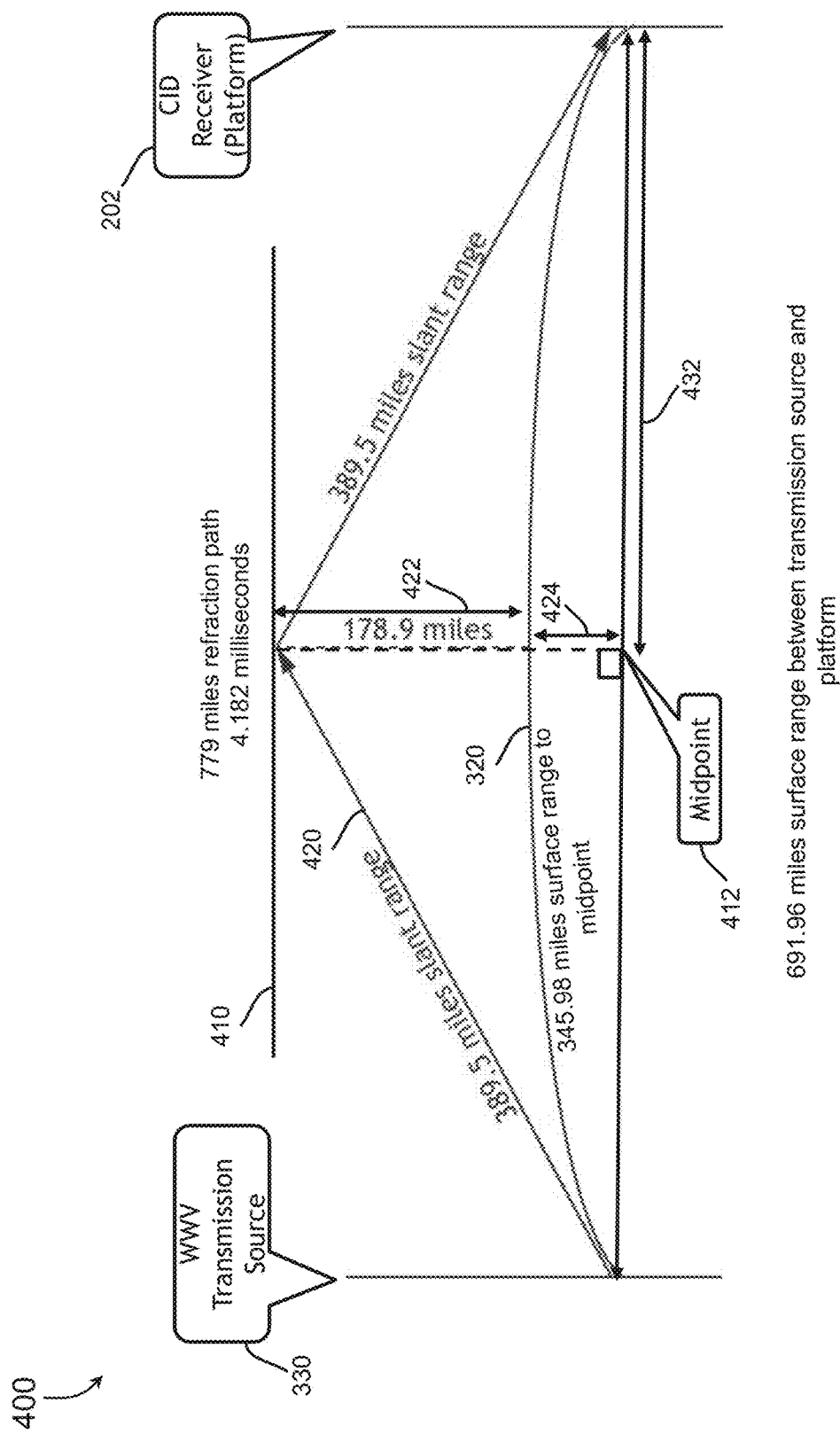
FIG. 4 is a diagram of a side view of HF signal travel exemplary of one embodiment of the inventive concepts disclosed herein.

Referring now to FIG. 4, a diagram of a side view of HF signal travel exemplary of one embodiment of the inventive concepts disclosed herein is shown. The side view 400 may indicate one geometrical solution the controller 110 may use to determine the precise HF positioning solution 210 of the platform 202.

A refraction Path 420 (e.g., total slant range up and down) may be defined as a path the HF timing signal may follow as the signal is transmitted from the transmission source 330, refracted from an ionosphere 410, and received by the receiver 104 onboard the platform 202 at CID. Here a propagation time of the HF timing signal may follow along the refraction path 420 at the speed of light leading the controller 110 to a mathematical distance solution. The controller 110 may also employ a midpoint 412 and a midpoint ionospheric altitude 422, a depth at midpoint 424 and a midpoint range 432 from the platform 202 to perform a geometric solution to each variable.

Within the memory 112, an earth geometric dataset may supply the controller 110 with constants concerning earth curvature with variations therein at specific locations throughout the earth.

Table Update

In one embodiment of the inventive concepts disclosed herein, the controller 110 may function to update the table of ionospheric altitudes while the platform 202 may be in a known position (e.g., eliminating one variable in each of the mathematical and geometric computations). The HF timing signals used for the table update may be sourced from anywhere within HF range of the platform 202 and the controller 110 may continuously update the known position solution to track the midpoint ionospheric altitude 422 as well as a mean. The update of the table of ionospheric altitudes while in a known position (on the surface or airborne) may offer the operator a more accurate eventual solution for HF positioning calculations.

In one embodiment of the inventive concepts disclosed herein, the HF timing signals may include an HF timing signal initial burst 506 (see FIG. 5) sent from the transmission source relative to the timing reference. This initial burst 506 may be of particular interest to the accuracy of the eventual HF positioning solution 210. For accuracy of locating the beginning of the initial burst 506, the controller 110 may employ a correlation of a plurality of sinewave cycles included within the initial burst 506 of the HF timing signal to accurately determine the exact TOA of the initial burst 506.

In one embodiment of the inventive concepts disclosed herein, the known position as received from an onboard positioning source may include a GNSS based position input to the INS, a surface position input to the INS via the platform 202 crew, and an INS based position of desired accuracy. As the GNSS may update the INS, while the platform 202 is either stationary or in motion, the known position may source from the GNSS. Should the INS 120 be operating within a specific level of accuracy, the controller 110 may use a known position sourced from the INS. Should the platform 202 be stationary on the surface, a crewmember may read (or sense) coordinates from the surface of, for example, a taxiway, and enter the coordinates to the INS 120 via the display 116 or by additional methods.

The controller 110 may receive the known position from one or more onboard sources (e.g., the INS 120) and receive a digital version of one or more HF timing signals of the plurality of HF timing signals via the multi-channel HF receiver 104 and the A/D converter 106. Once received, the controller 110 may passively determine a transmission source identification (ID) of the received HF timing signal based on data within the received HF timing signal. Once ID is complete, the controller 110 may recall a transmission source position from the memory 112 based on the transmission source ID.

In one embodiment of the inventive concepts disclosed herein, many platforms have multiple communication sources (e.g., MUOS, Link-16 etc.) which may be inherently time synchronized and even location enabled to some degree of accuracy. For example, a knowledge spot-beam ID may provide a location confirmation within some degree of accuracy. Moreover, Link-16 using relative navigation may provide a greater level of location accuracy These multiple communication sources may enable the controller 110 to employ multiple sources of providing the known position for redundancy thereby forcing a potential adversary to deny a plurality of sources of accurate known position location determination. In one embodiment of the inventive concepts disclosed herein, the controller 110 may employ a Kalman filter to ensure a desired level of accuracy of the known location.

The controller 110 may use the above correlation techniques to determine a measured time of arrival (TOA) of the received digital HF timing signal. The measured TOA may be useful in determining the time of propagation of each HF timing signal from the transmission source 330 to the receiver 104 onboard the platform 202 as refracted from the ionosphere 410.

The controller 110 may compare the measured TOA of the HF timing signal to the timing reference 118 to determine the propagation time from transmission source 330 to multichannel HF receiver 104. From this information, the controller 110 may determine a refraction path 420 of the HF timing signal based on the propagation time. Using the speed of light, the controller 110 may mathematically determine the refraction path 420 from the propagation time.

For update of the table, the controller 110 may determine the midpoint ionospheric altitude 422 at the midpoint 412 between the known position and the transmission source 330 position based on the refraction path 420 and the transmission source 330 position. Once determined, the controller 110 may update the table of ionospheric altitudes within the memory 112 based on the determined midpoint ionospheric altitude 422.

HF Positioning Using Updated Table

Once updated, the table of ionospheric altitudes within the memory 112 may provide the platform 202 with a more accurate representation of the ionospheric altitudes while later in an unknown position.

In one embodiment of the inventive concepts disclosed herein, the controller 110 may receive the plurality of HF timing signals on the plurality of HF frequencies and isolate two or more HF timing signals for accurate HF positioning. As before, the controller 110 may determine the transmission source ID of each of the isolated HF timing signals via a passive analysis of the isolated HF timing signals. In embodiments, the controller 110 may process each received HF timing signal in parallel with additionally received HF timing signals processing each received HF timing signal.

Contemplated herein, the memory 112 may include details of each worldwide transmission source 330 and the controller 110 may find each transmission source ID within data associated with the HF timing signal. Further, specific HF timing signals may include the transmission source 330 position usable by the controller 110 within the data associated with the signal. In this manner, each memory 112 may release space required for additional uses.

In one embodiment of the inventive concepts disclosed herein, the controller 110 may recall the transmission source 330 position of the isolated HF timing signals from the memory 112 based on the transmission source ID and designate two or more HF timing signals of the isolated HF timing signals to use to determine a positioning solution, the designation based on 1) the general position of the platform 202 from the INS 120, 2) a local date at the general position of the platform 202, 3) a local time at the general position of the platform 202, and 4) a frequency of the plurality of received HF timing signals.

Here, the general position of the platform 202 may be highly accurate or drifting with an anticipated INS drift (e.g., one NM per hour). Generally, the controller 110 may rely on the general position of the platform 202 not for accurate HF positioning solutions 210 but may be useful for designating the HF timing signals to use for the HF positioning solution 210. In designating the signals as useful, the controller 110 may also assign an angular value to each received HF timing signal. Here, one desirable method may include designation of two angularly dissimilar HF positioning signals for the HF positioning solution. For example, the controller 110 may use the transmission source 330 ID of each signal to determine a desired angular relationship between each received HF timing signal. One desirable angular dissimilar pair of signals may include two signal 90 degrees apart from each other. In this manner, the controller 110 may designate not only desirable correlated signals, but also angularly dissimilar signals to increase the accuracy of the HF positioning solution.

Using this data, the controller 110 may determine the midpoint 412 between the transmission source 330 position and the general position of the platform 202 for each of the designated HF timing signals. Once the controller 110 calculates the midpoint 412, it may recall the midpoint ionospheric altitude 422 at the midpoint 421 of each of the designated HF timing signals from the updated table of ionospheric altitudes. In one embodiment of the inventive concepts disclosed herein, the recall may be based on a local time and date at the midpoint 421.

The controller 110 may determine the measured TOA of each of the designated HF timing signals and compare the measured TOA with the timing reference to determine the propagation time. From the propagation time, the controller 110 may determine the refraction path 420 of each of the designated HF timing signals based on the propagation time and the midpoint ionospheric altitude.

Using the Earth geometric constants within the memory, the controller 110 may determine a surface range between the platform 202 and each transmission source of the designated HF timing signals based on the refraction path and the midpoint ionospheric altitude and determine the passive HF positioning solution 210 of the platform 202 based on 1) the general position of the platform 202 and 2) the surface range 320 between the platform 202 and each transmission source 330 of the designated HF timing signals.

In one embodiment of the inventive concepts disclosed herein, the controller 110 may apply the updated table of ionospheric altitudes for accurate HF positioning solutions 210 in the general location of each midpoint of anticipated useful HF timing signals. In embodiments, the controller 110 may perform a limited local update including collaborative update communicated between each platform 202 within a designated local area. In this manner, each platform 202 may benefit from signals received by other platforms within the local area.

In one embodiment of the inventive concepts disclosed herein, the system for passive HF positioning 100 may be configured to receive HF signals in addition to those HF signals currently transmitted as a time reference. For example, an encrypted HF timing signal of sufficient power and bandwidth may be transmitted from specific stations (stationary or in motion) around the globe for use by a controller 110 specifically configured for receipt and descrambling of the designated signals. Some encrypted HF positioning signals may include a location, a velocity, and a heading of the transmission source 330 precluding a requirement for alternative distribution sources such as MUOS etc. In one embodiment of the inventive concepts disclosed herein, the system for passive HF positioning 100 may include a layer between the A/D converter 106 and the controller 110 for decryption of an incoming encrypted HF timing reference signal.

FIGS. 5A-5C

Figure 5B:
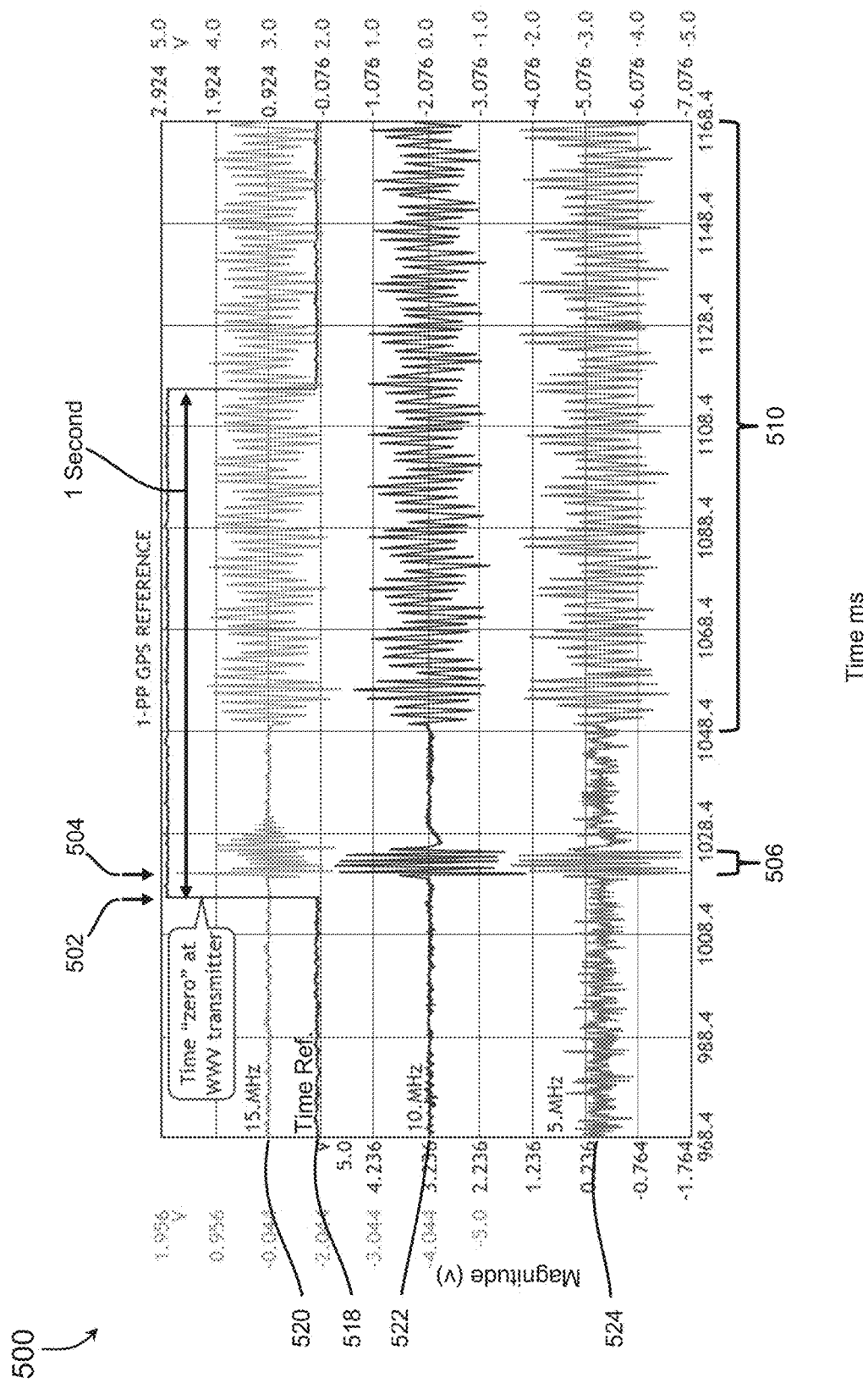
Figure 5C:
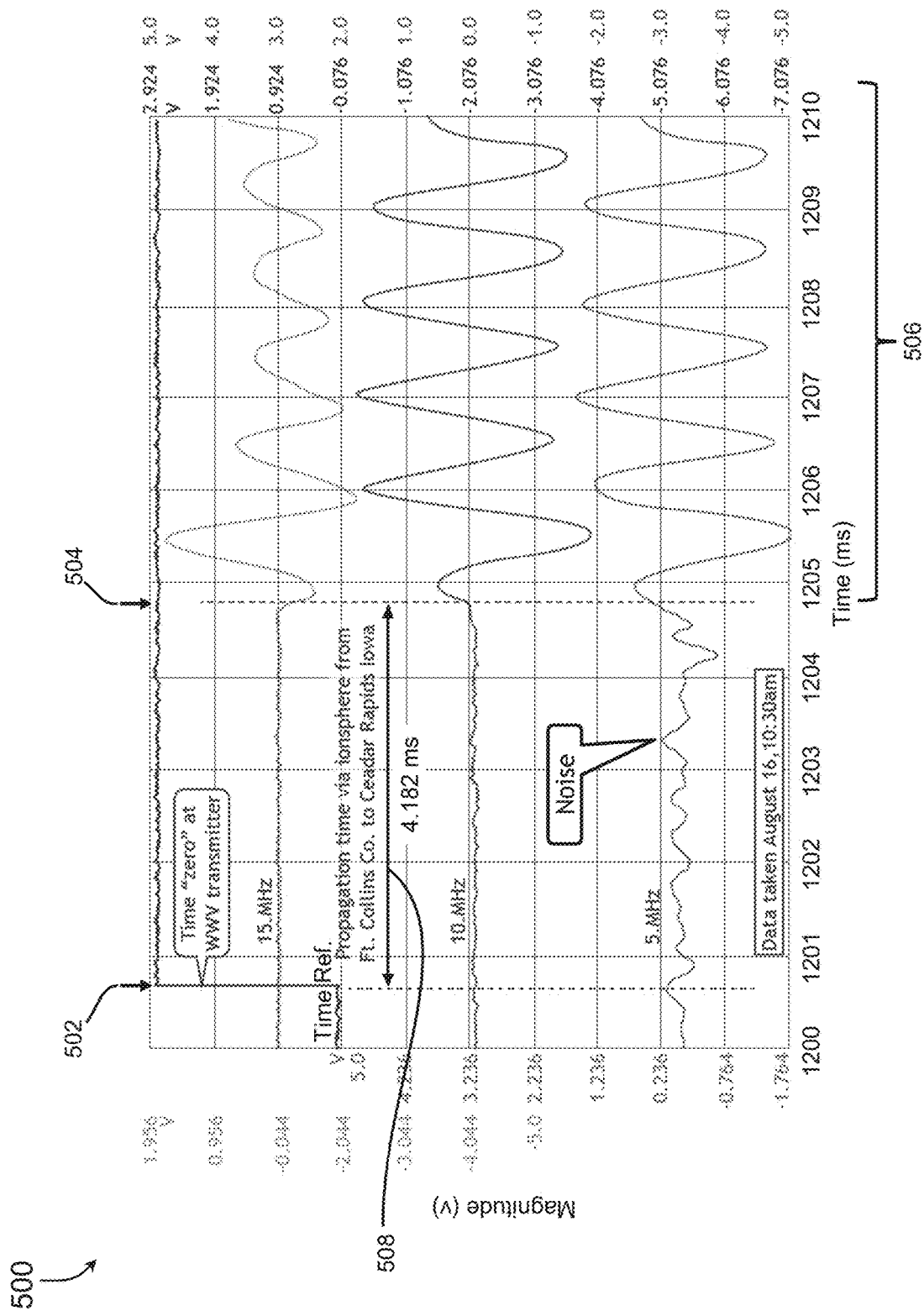

Referring now to FIG. 5A-5C, diagrams of an exemplary reception plot at the platform in accordance with one embodiment of the inventive concepts disclosed herein is shown. The reception plots 500 may indicate signals received by the multi-channel receiver 104. A graph with four curves may indicate a plotted HF timing signal transmitted from the transmission source in WWV and received at the platform 202 in CID and. A plot of the timing reference 518 may indicate the accurate time useable by each of the transmission source and the multi-channel HF receiver 104. A plot of a 15 MHz reception curve 520, a plot of a 10 MHz reception curve 522, and a plot of a 5 MHz reception curve 524 may indicate reception of the three frequencies at the multi-channel HF receiver 104 at the platform 202 in CID.

Referring to FIG. 5A, a validation of the function of the system for passive HF positioning 100 may include thousands of measurements made to determine a mean-TOA variation for one and two hop transmissions from the transmission source 330 at WWV in Colorado at 2.5 MHz, 5 MHz, 10 MHZ, 15 MHZ and 20 MHz from early morning to late at night.

Each transmission source 330 may vary, however, an exemplary plot of the WWV transmission source 330 may indicate timing data useful to the system for passive HF positioning 100. Here, some seconds (01, 02, 03) may include identical data transmitted each second yet other seconds (58, 59) may be different. For example, at the 00 second (each minute), the WW transmission source 330 may transmit 800 cycles at 1 KHz at full power to identify the minute.

Of note, the system for passive HF positioning 100 may be adaptable to a plurality of types of transmission sources 330, frequencies, and data transfer protocols as long as the transmission source does transmit a HF signal at a specific time (e.g., UTC time zero). In one embodiment of the inventive concepts disclosed herein, the controller 110 may employ pre-arranged signals using time markers at a known time as long as the controller 110 is aware of the transmission time. For example, the transmission source and the controller 110 may be configured to rely on an HF timing signal transmitted at a UTC time offset by a deterministic amount. In this manner, additional levels of security may enable the controller 110 designate desirable signals. The system for passive HF positioning 100 may receive these variable types of timing references, use the HF timing signals to determine the HF positioning solution 210 and use the solution solely as well as update onboard systems (e.g., INS) for accurate platform 202 navigation.

FIG. 5B may represent an expanded view of the same data transmitted from the WWV transmission source 330 and received at the platform 202 (CID). Within the plot of the timing reference 518, a time zero 502 may indicate a beginning of a second of time. As used herein, the "second of time" may be in reference to any of a plurality of seconds of time within the HF timing signals sent by the transmission source 330 broadcast on the desired frequency. Also, the time zero may indicate the time the transmission source begins to transmit each of the HF timing signals.

Of importance to the controller 110, a TOA at platform 504 may indicate a TOA of each of the three HF timing signals at the appropriate frequencies at the platform 202 (here, CID). This TOA at the platform 504 may offer the controller 110 a tool to determine a propagation time from the transmission source 330 to the platform 202. At the start of the TOA at platform 504, the HF timing signals may include an HF timing signal initial burst 506 indicating to a listener the beginning of the second of time.

After the initial burst transmission 506, a series of data 510 describing the initial burst 506 may follow. This data 510 may include a binary sentence descriptive of the initial burst 506. For example, one instance of the data 510 may include a sentence describing what second a five-cycle initial burst 506 may represent.

Of specific interest to the controller 110, referencing the 10 MHz curve 522, the specific transmission source 330 (here, WWV) may inhibit transmission of any data prior to the transmission of the initial burst 506. This inhibition may lead to a very clean edge at the first reception of the initial burst 506 at the platform 202 indicating the precise time of reception of the initial burst 506.

In one embodiment of the inventive concepts disclosed herein, the controller 110 in executing the correlation of the plurality of cycles within the initial burst 506 may include a correlation of approximately five and one-half cycles indicated here clearly within the 10 MHz reception curve 522. Employing the correlation, the controller 110 may accurately determine the TOA of the HF timing signal.

FIG. 5C may be an expanded view of the same data found in FIGS. 5B and 5A. Here the timing reference 518 may clearly indicate a time zero 502, the time at which the transmission station (WWV) begins to transmit the HF timing signal on a plurality of frequencies. The controller 110 may use the time zero 502 to begin to count an elapsed propagation time 508 the signal may take from the transmission source 330, up to the ionosphere 410, and refracted down to the multi-channel receiver 104 on the platform 202.

This propagation time 508 may correspond to the slant range found in FIG. 3 and therefore, the controller 110 may mathematically determine a distance of the total slant range 420 between transmission source 330 and platform 202 multi-channel receiver 104. The controller 110 may then geometrically determine the surface range 430 along the curvature of the earth from transmission source to platform 202 multi-channel receiver.

Here, in this exemplary data curve indicating the propagation time 508 from the transmission station at WWV to the platform 202 multi-channel receiver at CID measured as 4.182 milliseconds (0.004182 seconds) leading to a total slant range of an exemplary 779 miles.

The 15 MHz and 10 MHz signals may offer a clean TOA edge here at the specific time of day the measurements were taken (e.g., 1030 local time in CID). Conversely, the 5 MHz signal may offer a less sharp edge of TOA which still may be usable but may offer a lesser accuracy than the sharper signals, 15 MHz and 10 MHz, may provide. Here, the 5 MHz signal may indicate some noise prior to as well as after (FIG. 5) the TOA of the HF timing signal indicating some ionospheric noise present. This fact may be represented within the table of ionospheric altitudes within the memory 112 indicating to the controller 110 the 5 MHz signal may be less useful at this time of day.

Oversampling

In one embodiment of the inventive concepts disclosed herein, the controller may oversample the received HF timing signals at 100 to 10,000 or greater times per second to achieve desired accuracy. A greater correlation of the received HF timing signals may lead to a greater accuracy in determining the measured TOA.

In one embodiment of the inventive concepts disclosed herein, the controller 110 may determine the measured TOA of each of the designated HF timing signals using a correlation of a plurality of sinewave cycles included within the initial burst 506 of the HF timing signal.

In one embodiment of the inventive concepts disclosed herein, the controller 110 may assign a correlation value to each signal at the TOA of each. In some embodiments, the correlation value may be dependent upon a signal to noise ratio of the received HF positioning signal. A lower correlation value among the oversampled values may lead the controller 110 to ignore the signal while a higher correlation value may lead the controller 110 to designate the signal as having an acceptable correlation value and therefore useful. In one embodiment of the inventive concepts disclosed herein, the controller 110 may designate signals of approximately equal correlation value based on the angular dissimilarity of each transmission source position relative to the general position of the platform.

FIG. 6

Figure 6:
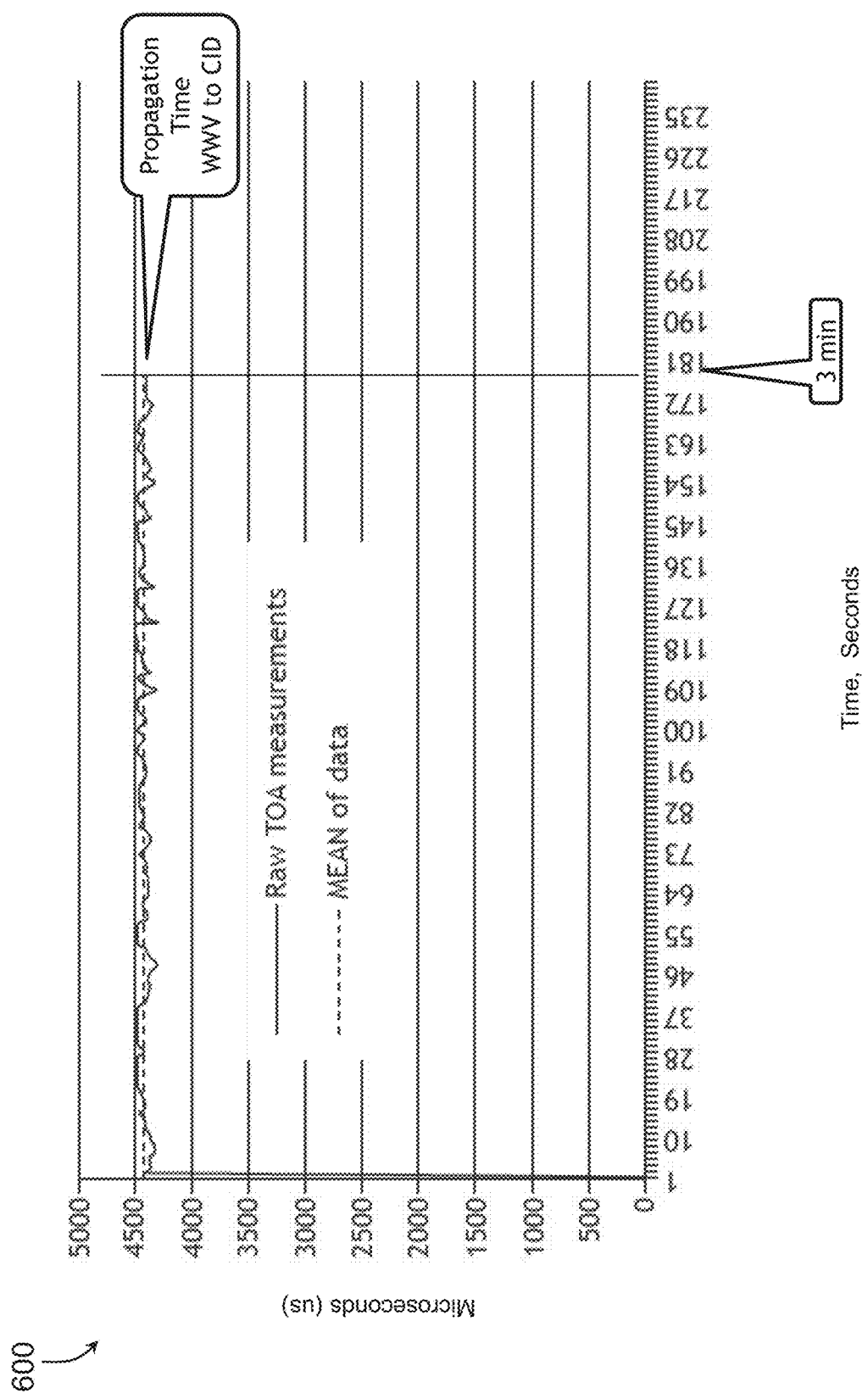
FIG. 6 is a diagram of exemplary raw measurements in accordance with one embodiment of the inventive concepts disclosed herein.

Referring now to FIG. 6, a diagram of exemplary raw measurements in accordance with one embodiment of the inventive concepts disclosed herein is shown. Raw measurements plot 600 may illustrate 176 raw measurements taken over a 240 second period. The transmission source 332 at WWV may not transmit the HF timing signal initial burst 506 every second and some seconds may be lost to noise. These illustrative measurements were on 10 MHz indicating the propagation time from WWV to CID at 1830 in the month of September, 2019. The dotted curve may represent the mean value over all 176 samples where the variation is a desirably very small percentage of the elapsed wave-front travel time.

FIG. 7

Figure 7:
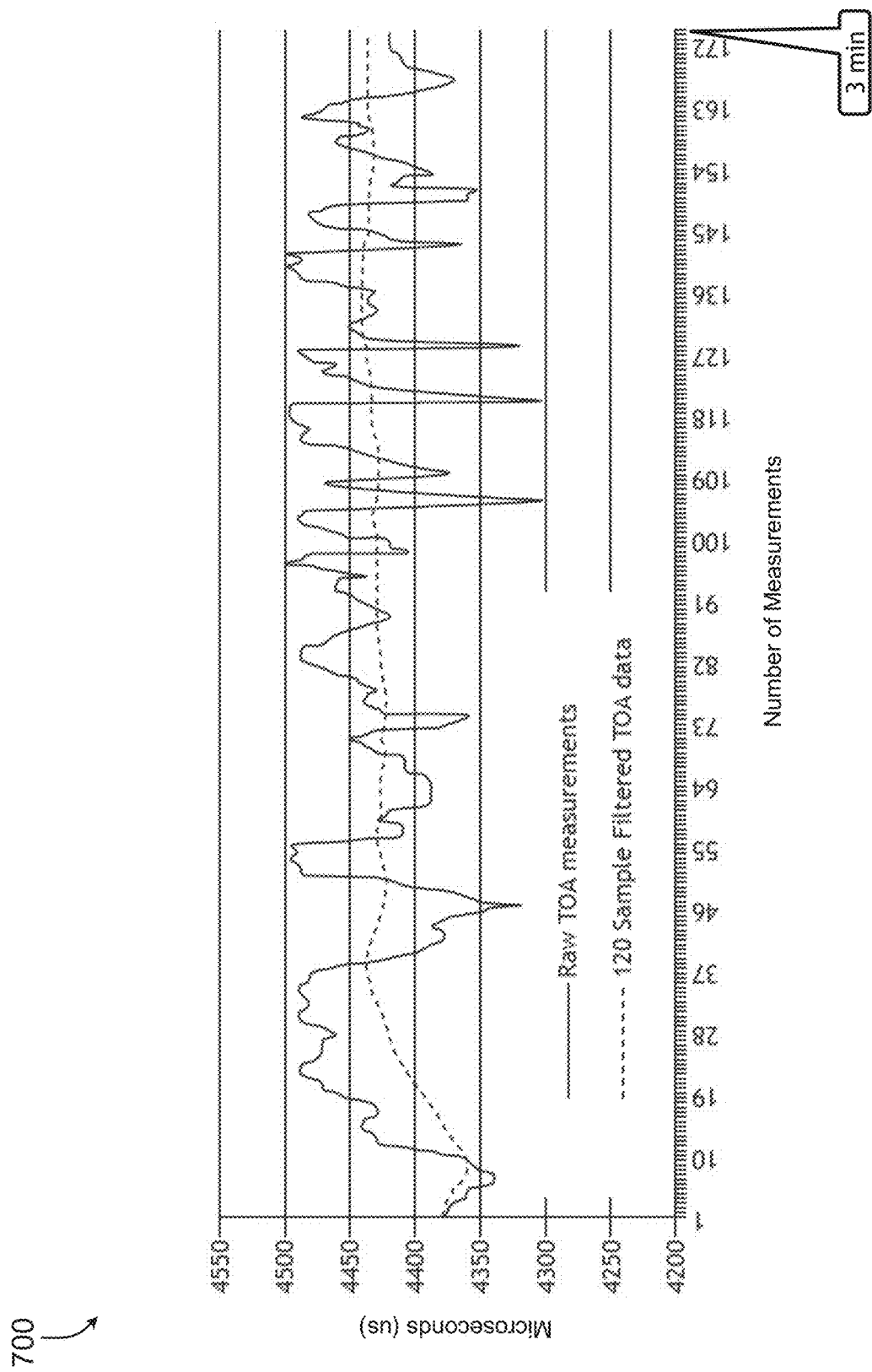
FIG. 7 a diagram of expanded raw measurements associated with one embodiment of the inventive concepts disclosed herein.

Referring now to FIG. 7, a diagram of expanded raw measurements associated with one embodiment of the inventive concepts disclosed herein is shown. The curve of expanded raw measurements 700 may illustrate a three-minute set of an expanded version of the same data as presented in FIG. 6 with the additional dotted curve showing the effect of a 120-sample running average filter. Here, the 120-sample running aver may indicate a peak deviation from the mean of less than +/−7 us.

FIG. 8

Figure 8:
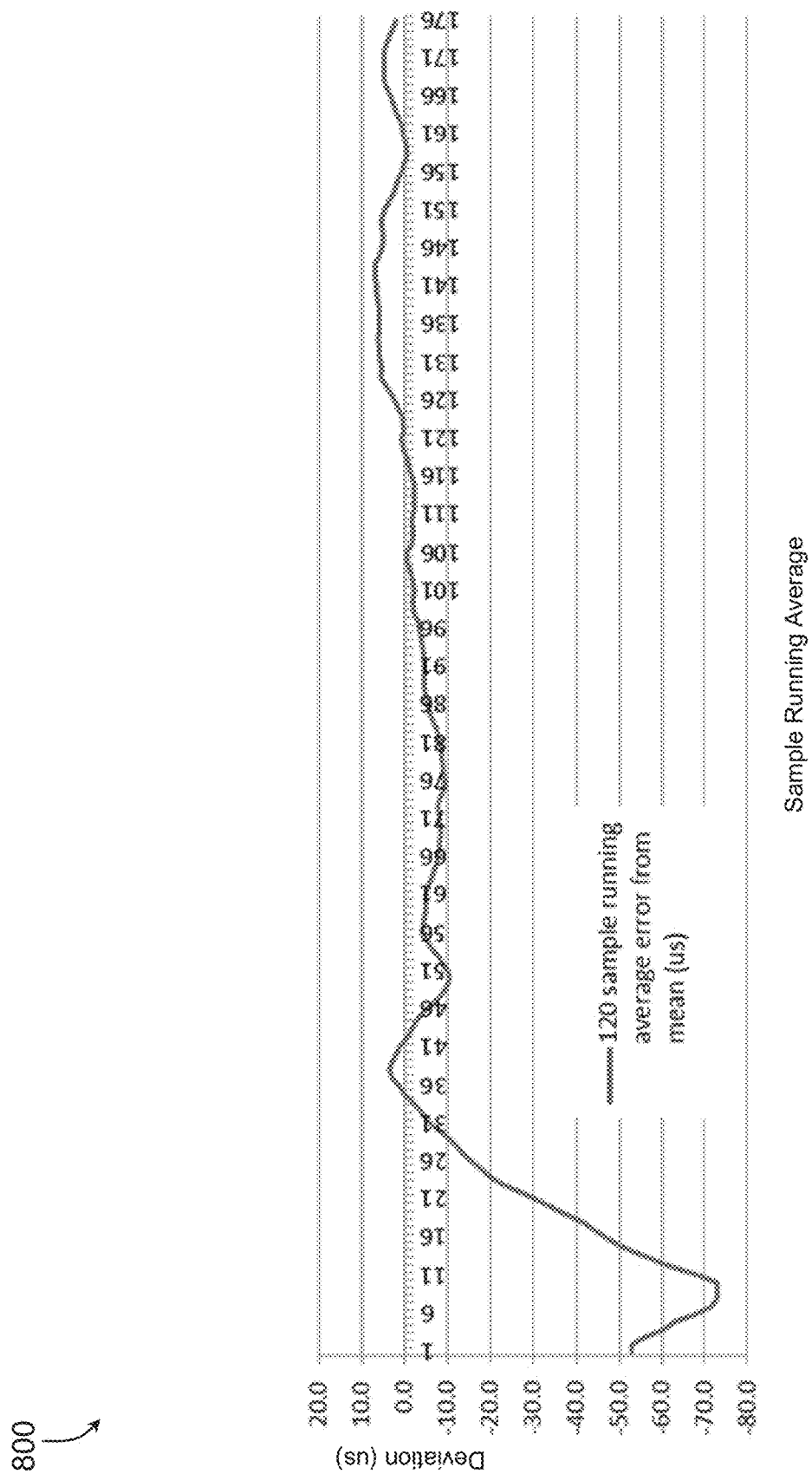
FIG. 8 is a diagram of sample running average exemplary of one embodiment of the inventive concepts disclosed herein.

Referring now to FIG. 8, a diagram of sample running average 800 exemplary of one embodiment of the inventive concepts disclosed herein is shown. A deviation from the mean for the output of the 120-sample running-average filter, starting after 120 seconds of the measured TOA may indicate a +/−8 us deviation which may translate to +/−1.5 mile in error for the HF positioning solution 210.

For reference, if the ionosphere was stationary, the curve would represent a straight line. However, as the ionospheric altitude undulates, the curve may accurately represent the deviation in measured TOA from the mean.

In one embodiment of the inventive concepts disclosed herein, the individual over the air measurements show only a variation of about +/−40 microseconds, with a slow random drift about the mean, which, when averaged over time, may be the true distance between the transmitter and multi-channel receiver for that time (date, time of day) and frequency: With focus on the filtered TOA data, a distinct pattern of ionospheric undulations appears indicating a relatively small error in ionospheric altitude during a short period during a day. This may indicate that the operator who accurately updates the table of ionospheric altitudes at the known location may enjoy continuous and accurate HF positioning solution 210 during a period after update.

For example, an operator may update the table of ionospheric altitudes before a relatively short flight of four hours from a runway to an area and back may find accurate HF positioning solutions 210 during the four-hour flight.

FIG. 9

Figure 9:
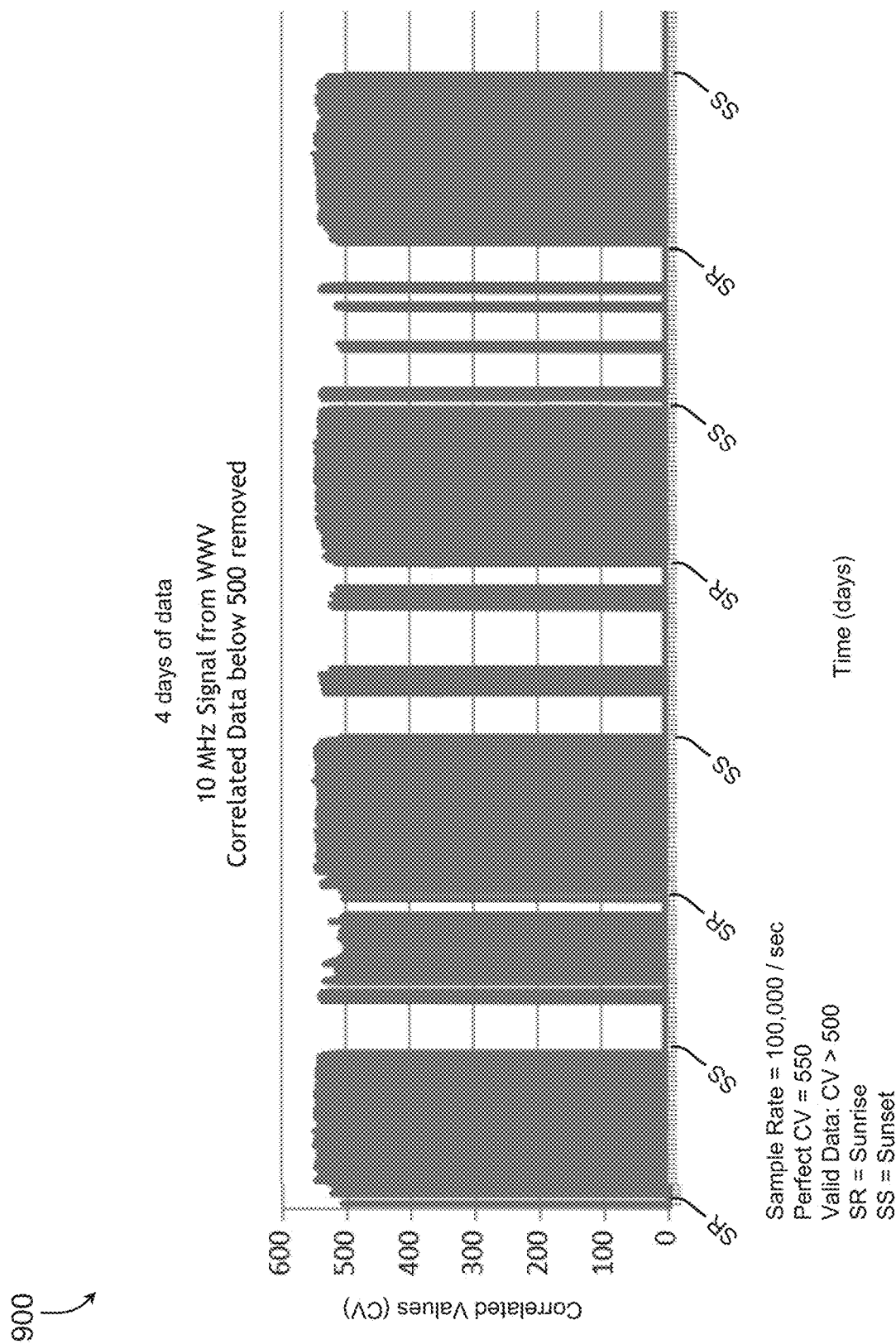
FIG. 9 is a diagram of a four-day period plot exemplary of one embodiment of the inventive concepts disclosed herein.

Referring now to FIG. 9, a diagram of a four-day period plot exemplary of one embodiment of the inventive concepts disclosed herein is shown. Within the four-day plot 900, each one-second transmission from WWV may be a 5.5 cycle initial burst 506 of sinewaves at exactly 1 KHz. The controller 110 may sample the raw transmission at 100,000 samples per second leading the controller 110 to determine the measured TOA (the start of the initial burst 506) using 550 data samples. As the controller 110 may correlate the data to match each of the HF timing signals every 10 microseconds (e.g., at 100,000 samples per second) to precisely locate the start of the 5.5 cycle initial burst 506. A perfectly correlated 5.5 cycle burst 506 may have a correlation of 550. Random noise may average half of 550 or about 275.

The four-day plot 900 may indicate 345,600 seconds of transmissions (4 days of seconds) at 10 MHz from WWV received at CID (a line of sight distance of approximately 990 miles) where invalid measurements that correlated below 500 removed. The level of the top of the resulting data are the values that validly correlated above 500. The curve begins at approximately 2100 local time and a clear level top of the 10 MHz signal is producing valid measurements during the day on each side of sunrise (SR) and sunset (SS). Additional frequencies may function better at night (e.g., 2.5 and 5 MHz) while some may only work in the daytime (e.g., 15, and 20 MHz) and the highest, 25 MHz, (in 2019) rarely works anytime because the sun is at the lowest part of a predictable 11-year solar cycle.

FIG. 10

Figure 10:
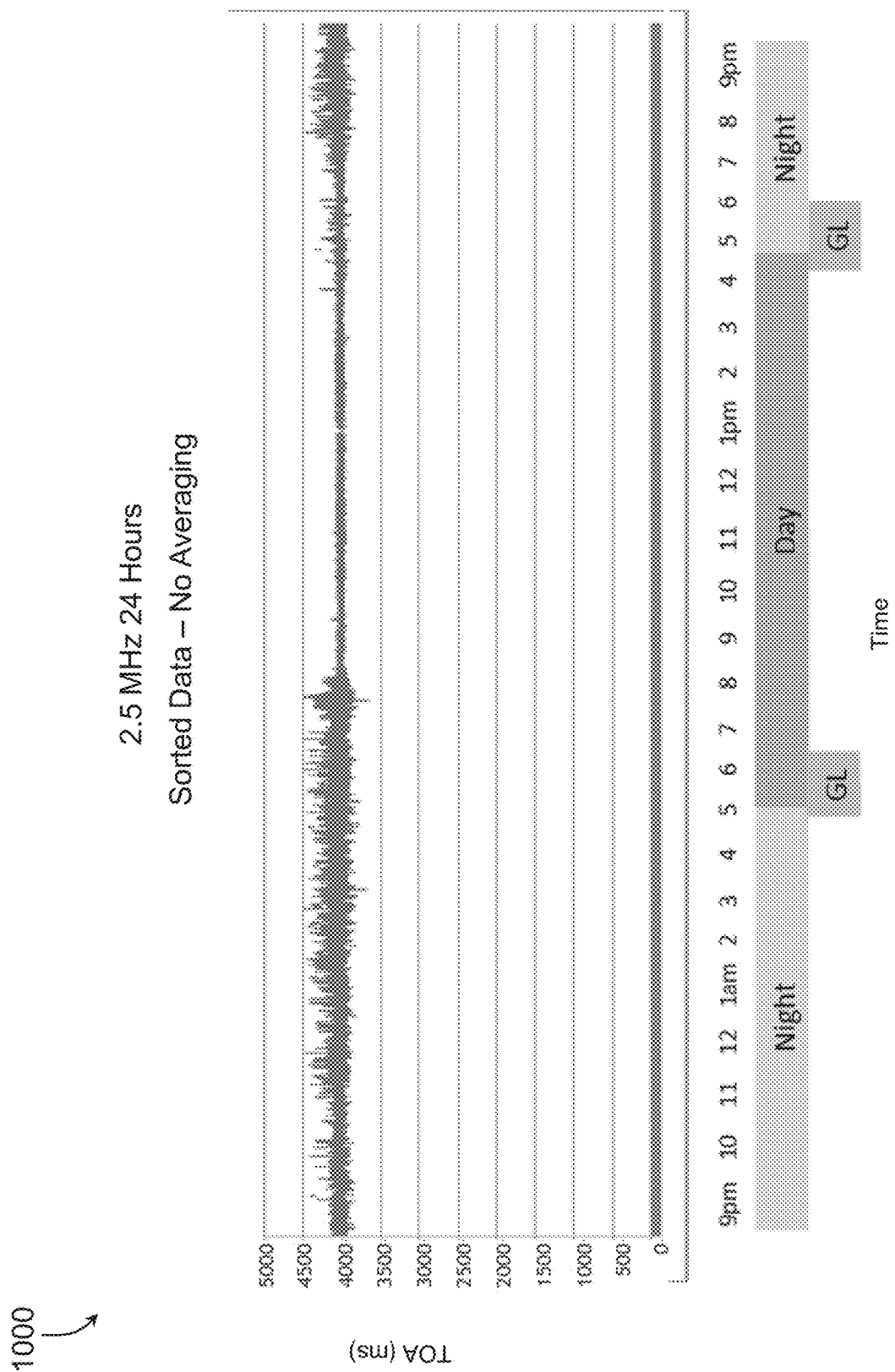
FIG. 10 is a diagram of a 24-hour period plot exemplary of one embodiment of the inventive concepts disclosed herein.
Figure 11:
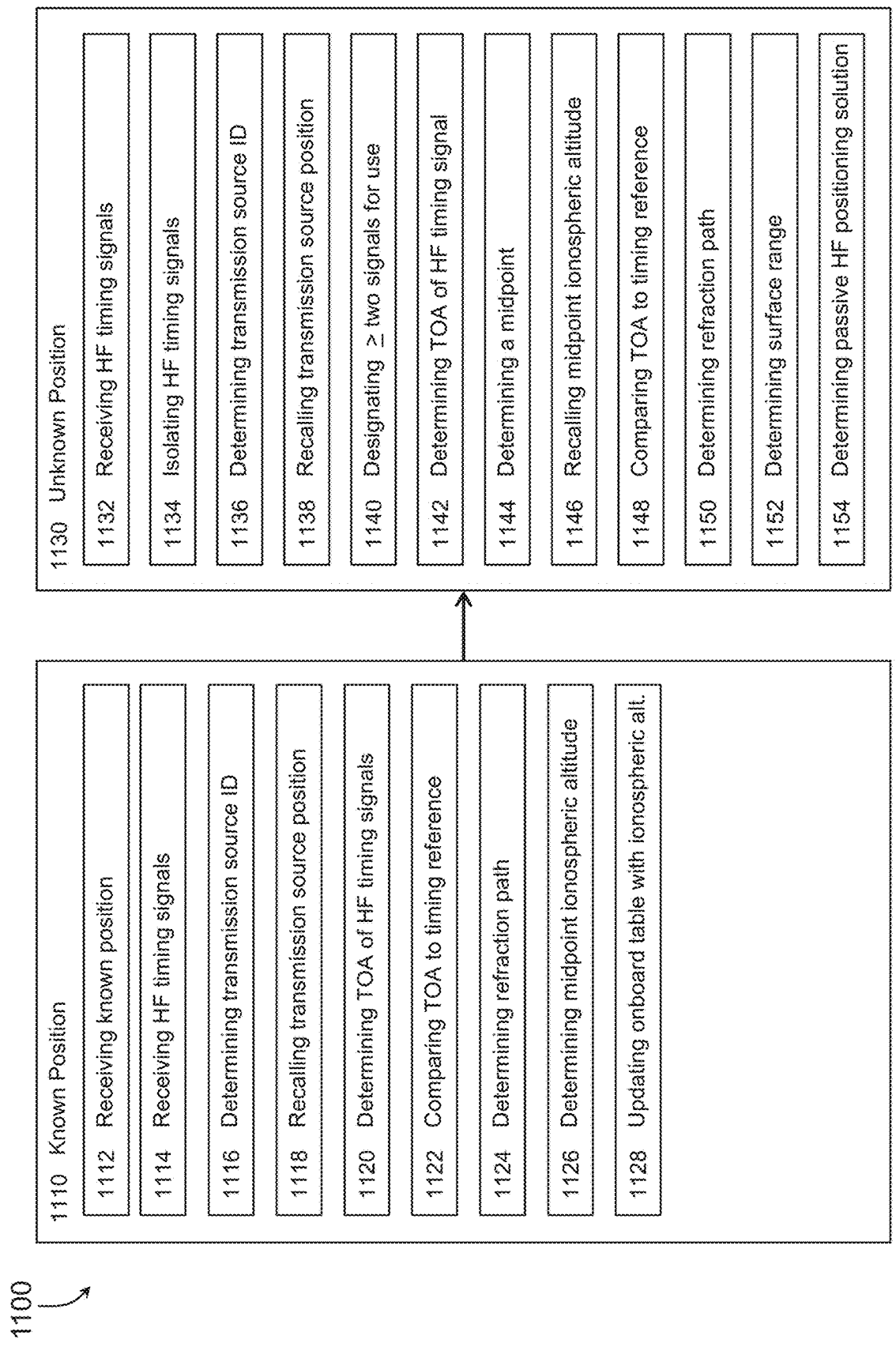
FIG. 11 is a diagram of a method flow exemplary of one embodiment of the inventive concepts disclosed herein.

Referring now to FIG. 10, a diagram of a 24-hour period plot exemplary of one embodiment of the inventive concepts disclosed herein is shown. The 24-hour plot 1000 may indicate dissimilar data from FIG. 9. A 2.5 MHz plot of TOA with invalid (e.g., correlated less than 500) measurements removed, may illustrate ionospheric undulations over the 24 hours. Here, the height represents the actual TOA of the initial burst 506 at the multi-channel HF receiver 104 at the platform 202 in CID. Any variation in the height may indicate how the ionosphere is physically undulating up and down causing longer and shorter travel times between WWV and CID.

As may be seen, the 2.5 MHz HF timing signal (and thus, the ionospheric altitude 422) may become more stable during times which the sun is above the horizon, A grey line (GL) may indicate an edge of the sun's shadow (e.g., the coming of night or day) approximating the stability of the HF timing signal TOA.

FIG. 11

Referring now to FIG. 10, a diagram of a method flow 1100 exemplary of one embodiment of the inventive concepts disclosed herein is shown. The method 1100 may include, in a series, 1110, of illustrative steps in a known position: a step 1112 of receiving the known position of a platform from an onboard positioning source and, at a step 1114 receiving at least one HF timing signal of a plurality of HF timing signals. A step 1116 may include determining a transmission source identification (ID) of the received at least one HF timing signal while a step 1118 may include recalling a transmission source position from an onboard memory based on the transmission source ID.

A step 1120 may include determining a measured time of arrival (TOA) of the at least one HF timing signal and a step 1122 may include comparing the TOA of the at least one HF timing signal to an onboard timing reference to determine a propagation time. A step 1124 may include determining a refraction path of the at least one HF timing signal based on the propagation time, the known position, and the transmission source position while a step 1126 may include determining a midpoint ionospheric altitude at a midpoint between the known position and the transmission source position based on the known position, the refraction path and the transmission source position. A step 1128 may include updating the table of ionospheric altitudes within the onboard memory based on the determined midpoint ionospheric altitude.

The method 1100 may include, in a series, 1130, of illustrative steps in an unknown position: receiving a plurality of HF timing signals on a plurality of HF frequencies at a step 1132 and at a step 1134, isolating at least two HF timing signal of the received plurality of HF timing signals. A step 1136 may include determining the transmission source identification (ID) of the received at least one HF timing signal while a step 1138 may include recalling the transmission source position from the onboard memory based on the transmission source ID.

A step 1140 may include designating at least two HF timing signals of the isolated at least two HF timing signals to use to determine a positioning solution, the designating based at least on 1) a general position of the platform, 2) a local date at the general position of the platform, 3) a local time at the general position of the platform, and 4) a frequency of the isolated at least two HF timing signals. A step 1142 may include determining a measured TOA of each of the designated at least two HF timing signals while a step 1144 may include determining a midpoint between the transmission source position and the general position of the platform for each of the designated at least two HF timing signals.

A step 1146 may include recalling a midpoint ionospheric altitude at the midpoint of each of the designated at least two HF timing signals from the updated table of ionospheric altitudes while a step 1148 may include comparing the measured TOA with the onboard timing reference to determine a propagation time for each of the designated at least two HF timing signals. A step 1150 may include determining a refraction path of each of the designated at least two HF timing signals based on the propagation time and the midpoint ionospheric altitude. For passive HF positioning, a step 1152 may include determining a surface range between the platform and each transmission source of the designated at least two HF timing signals based on the refraction path and the midpoint ionospheric altitude and a step 1154 may include determining a passive HF positioning solution of the platform based on 1) the general position of the platform and 2) the surface range between the platform and each transmission source of the designated at least two HF timing signals.

CONCLUSION

As will be appreciated from the above description, embodiments of the inventive concepts disclosed herein may provide a novel solution to accurate and passive HF positioning.

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed is:

1. A system for passive high frequency (HF) positioning, comprising:
 a multi-channel HF receiver configured for passively receiving a plurality of HF timing signals on a plurality of HF frequencies;
 a controller operatively coupled with each of an analog to digital converter and an inertial navigation system (INS);
 the analog to digital converter operatively coupled with the multi-channel HF receiver;
 the inertial navigation system (INS) configured to determine 1) a general position of a platform and 2) a timing reference;
 a controller operatively coupled with each of the analog to digital converter and the INS;
 a tangible, non-transitory memory configured to communicate with the controller, the tangible, non-transitory memory including at least a table of ionospheric altitudes at a specific time, a specific date, and a specific position, a dataset of earth geometric constants, and a table of transmission source data representing a plurality of transmission sources, the tangible, non-transitory memory having instructions stored therein that, in response to execution by the controller, cause the controller to:
 while in a known position:
  receive the known position from an onboard positioning source;
  receive at least one HF timing signal of the plurality of HF timing signals;
  determine a transmission source identification (ID) associated with a transmission source of the received at least one HF timing signal;
  recall a transmission source position from the memory based on the transmission source ID;
  determine a measured time of arrival (TOA) of the at least one HF timing signal;
  compare the measured TOA of the at least one HF timing signal to the timing reference to determine a propagation time;
  determine a refraction path of the at least one HF timing signal based on the propagation time;
  determine a midpoint ionospheric altitude at a midpoint between the known position and the transmission source position based on the refraction path and the transmission source position; and
  update the table of ionospheric altitudes within the memory based on the determined midpoint ionospheric altitude;
 while in an unknown position:
  receive the plurality of HF timing signals on the plurality of HF frequencies;
  isolate at least two HF timing signals of the received plurality of HF timing signals;
  determine a transmission source ID of each of the isolated at least two HF timing signals via a passive analysis of the isolated at least two HF timing signals;
  recall the transmission source position of the isolated at least two HF timing signals from the memory based on the transmission source ID;
  designate at least two HF timing signals of the isolated at least two HF timing signals to use to determine a positioning solution, the designation based at least on 1) the general position of the platform, 2) a local date at the general position of the platform, 3) a local time at the general position of the platform, and 4) a frequency of the plurality of received HF timing signals;
  determine a midpoint between the transmission source position and the general position of the platform for each of the designated at least two HF timing signals;
  recall a midpoint ionospheric altitude at the midpoint of each of the designated at least two HF timing signals from the updated table of ionospheric altitudes;
  determine the measured TOA of each of the designated at least two HF timing signals;
  compare the measured TOA with the timing reference to determine the propagation time;
  determine a refraction path of each of the designated at least two HF timing signals based on the propagation time and the midpoint ionospheric altitude;
  determine a surface range between the platform and each transmission source of the designated at least two HF timing signals based on the refraction path and the midpoint ionospheric altitude; and
  determine a passive HF positioning solution of the platform based on 1) the general position of the platform and 2) the surface range between the platform and each transmission source of the designated at least two HF timing signals.

2. The system for passive high frequency (HF) positioning of claim 1, wherein the plurality of HF timing signals further comprise an HF timing signal initial burst sent from the transmission source relative to the timing reference.

3. The system for passive high frequency (HF) positioning of claim 2, wherein determine the measured TOA of each of the designated at least two HF timing signals further comprises a correlation of a plurality of sinewave cycles included within the initial burst of the at least one HF timing signal.

4. The system for passive high frequency (HF) positioning of claim 1, wherein the timing reference further includes at least one of: a timing reference relative to a coordinated universal time, a timing reference broadcast within a network, and a timing reference broadcast within the HF timing signal, and wherein the plurality of HF frequencies further comprises an approximate range of 2 MHz to 30 MHz.

5. The system for passive high frequency (HF) positioning of claim 1, further including a decryption device between the multi-channel HF receiver and the controller.

6. The system for passive high frequency (HF) positioning of claim 1, wherein the known position further includes a GNSS based position input to the INS, a surface position input to the INS, and an INS based position of desired accuracy.

7. The system for passive high frequency (HF) positioning of claim 1, wherein update the table of ionospheric altitudes further comprises a limited local update including collaborative update communicated between at least two platforms within a designated local area.

8. The system for passive high frequency (HF) positioning of claim 1, wherein the platform further comprises one of a surface vehicle, a mobile device, a surface and subsurface vessel, an aerial vehicle, a handheld device, and an unmanned aircraft system (UAS).

9. The system for passive high frequency (HF) positioning of claim 1, wherein designate at least two HF timing signals of the plurality of received HF timing signals further comprises assigning each of a correlation value and an angular value to each received HF timing signal and designating the HF timing signals with one of: an acceptable correlation value and a desired angular value.

10. The system for passive high frequency (HF) positioning of claim 1, wherein designate at least two HF timing signals of the plurality of received HF timing signals further comprises designating signals of approximately equal correlation value based on the transmission source position relative to the general position of the platform.

11. The system for passive high frequency (HF) positioning of claim 1, wherein recall the midpoint ionospheric altitude at the midpoint of each of the designated at least two HF timing signals further comprises a recall based on a local time and date at the midpoint.

12. The system for passive high frequency (HF) positioning of claim 1, wherein the tangible, non-transitory memory further includes an earth geometric dataset, a solar dataset, a frequency propagation per time of day dataset, and a geomagnetic dataset.

13. A method for passive high frequency (HF) positioning, comprising:
while in a known position:
  receiving the known position of a platform from an onboard positioning source;
  receiving at least one HF timing signal of a plurality of HF timing signals;
  determining a transmission source identification (ID) associated with a transmission source of the received at least one HF timing signal;
  recalling a transmission source position from an onboard memory based on the transmission source ID;
  determining a measured time of arrival (TOA) of the at least one HF timing signal;
  comparing the measured TOA of the at least one HF timing signal to an onboard timing reference to determine a propagation time;
  determining a refraction path of the at least one HF timing signal based on the propagation time, the known position, and the transmission source position;
  determining a midpoint ionospheric altitude at a midpoint between the known position and the transmission source position based on the known position, the refraction path and the transmission source position; and
  updating a table of ionospheric altitudes within the onboard memory based on the determined midpoint ionospheric altitude;
while in an unknown position:
  receiving a plurality of HF timing signals on a plurality of HF frequencies;
  isolating at least two HF timing signals of the received plurality of HF timing signals;
  determining the transmission source identification (ID) of the received at least one HF timing signal;
  recalling the transmission source position from the onboard memory based on the transmission source ID;
  designating at least two HF timing signals of the isolated at least two HF timing signals to use to determine a positioning solution, the designating based at least on 1) a general position of the platform, 2) a local date at the general position of the platform, 3) a local time at the general position of the platform, and 4) a frequency of the isolated at least two HF timing signals;
  determining a measured TOA of each of the designated at least two HF timing signals;
  determining a midpoint between the transmission source position and the general position of the platform for each of the designated at least two HF timing signals;
  recalling a midpoint ionospheric altitude at the midpoint of each of the designated at least two HF timing signals from the updated table of ionospheric altitudes;
  comparing the measured TOA with the onboard timing reference to determine a propagation time for each of the designated at least two HF timing signals;
  determining a refraction path of each of the designated at least two HF timing signals based on the propagation time and the midpoint ionospheric altitude;
  determining a surface range between the platform and each transmission source of the designated at least two HF timing signals based on the refraction path and the midpoint ionospheric altitude; and
  determining a passive HF positioning solution of the platform based on 1) the general position of the platform and 2) the surface range between the platform and each transmission source of the designated at least two HF timing signals.

14. The method for passive high frequency (HF) positioning of claim 13, wherein determining the measured TOA of each of the designated at least two HF timing signals further comprises correlating a plurality of sinewave cycles included within an HF timing signal initial burst.

15. The method for passive high frequency (HF) positioning of claim 13, wherein determining the surface range between the platform and each transmission source of the designated at least two HF timing signals further comprises geometrically determining the surface range based on an earth geometric dataset within the onboard memory.

* * * * *